(12) United States Patent
Ooyama

(10) Patent No.: US 8,821,105 B2
(45) Date of Patent: Sep. 2, 2014

(54) TURBINE WITH VARIABLE NUMBER OF NOZZLES

(75) Inventor: Kazuo Ooyama, Tokyo (JP)

(73) Assignee: Joho Corporation, Tokyo (JP)

( * ) Notice: Subject to any disclaimer, the term of this patent is extended or adjusted under 35 U.S.C. 154(b) by 1337 days.

(21) Appl. No.: 12/377,860

(22) PCT Filed: Aug. 17, 2007

(86) PCT No.: PCT/JP2007/066006
§ 371 (c)(1),
(2), (4) Date: Jul. 22, 2010

(87) PCT Pub. No.: WO2008/020619
PCT Pub. Date: Feb. 21, 2008

(65) Prior Publication Data
US 2010/0278628 A1 Nov. 4, 2010

(30) Foreign Application Priority Data
Aug. 18, 2006 (JP) .................................. 2006-248694

(51) Int. Cl.
| F01D 17/12 | (2006.01) |
| F01L 1/38 | (2006.01) |
| F02B 75/02 | (2006.01) |
| F02M 35/108 | (2006.01) |
| F02M 35/10 | (2006.01) |
| F02M 25/07 | (2006.01) |
| F01L 1/08 | (2006.01) |
| F02B 31/00 | (2006.01) |

(52) U.S. Cl.
CPC .......... *F02B 75/021* (2013.01); *F02M 35/1085* (2013.01); *F02M 35/10203* (2013.01); *F01L 1/38* (2013.01); *F02M 25/0711* (2013.01); *Y02T 10/142* (2013.01); *F02M 25/072* (2013.01); *F02M 35/10222* (2013.01); *F01L 1/08* (2013.01); *F02B 2031/006* (2013.01); *F02M 25/0727* (2013.01)

USPC ................................ 415/1; 415/162; 415/194

(58) Field of Classification Search
CPC .......... F04D 15/0005; F04D 15/0027; F04D 15/0029; F04D 15/0072; F02B 75/021; F02B 2031/006; F02M 25/0727; F01L 1/38
USPC .................................. 415/162–165, 194, 195
See application file for complete search history.

(56) References Cited

U.S. PATENT DOCUMENTS 3,059,415 A * 10/1962 Birmann ......................... 60/611
4,534,166 A * 8/1985 Kelm et al. ................... 60/39.23
(Continued)

FOREIGN PATENT DOCUMENTS

| JP | 149525 | 5/1942 |
| JP | 2003-322025 | 11/2003 |
| JP | 2004-162595 | 6/2004 |

OTHER PUBLICATIONS

Japanese Patent Office, International Preliminary Report on Patentability for International Application No. PCT/JP2007/066006, Aug. 22, 2008.
(Continued)

*Primary Examiner* — Ned Landrum
*Assistant Examiner* — Woody A Lee, Jr.
(74) *Attorney, Agent, or Firm* — Sherr & Jiang, PLLC

(57) ABSTRACT

The nozzles include inlet ports circumferentially arranged into a group and an opening and closing valve disposed so as to be commonly functioned. This arrangement realizes a gas turbine with no deterioration of efficiency against fluctuation of gas inflow rate by only one heat-resistant moving component additionally installed. The variable nozzle number turbine according to this invention also realizes a turbine compressor with no surge limit when used as a regenerator. These turbines further realizes a small-sized gas turbine with improved fuel economy under partial load conditions and a turbocharger for regenerating electric power as well as improving efficiency of a displacement engine.

14 Claims, 11 Drawing Sheets

(56) References Cited

U.S. PATENT DOCUMENTS

| | | | | |
|---|---|---|---|---|
| 5,372,485 | A | * | 12/1994 | Sumser et al. ............... 417/407 |
| 5,454,225 | A | * | 10/1995 | Sumser et al. ................ 60/602 |
| 5,802,846 | A | * | 9/1998 | Bailey ........................... 60/278 |
| 6,402,465 | B1 | * | 6/2002 | Maier ............................ 415/159 |
| 7,458,764 | B2 | * | 12/2008 | Lombard et al. ............... 415/1 |
| 2003/0167767 | A1 | * | 9/2003 | Arnold ........................... 60/602 |
| 2004/0088978 | A1 | | 5/2004 | Kurihara et al. |

OTHER PUBLICATIONS

Japanese Patent Office, International Search Report for International Application No. PCT/JP2007/066006, Nov. 20, 2007.

* cited by examiner

TURBINE WITH VARIABLE NUMBER OF NOZZLES

This application is the U.S. National Phase under 35 U.S.C. §371 of International Application PCT Patent Application No. PCT/JP2007/066006, filed on Aug. 17, 2007, which claims priority to Japanese Patent Application No. 2006-248694, filed on Aug. 18, 2006; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The present invention relates to gas turbines having high efficiency for applications with a large fluctuation in amount of gas inflowing thereto and its use.

BACKGROUND ART

A gas turbine has excellent features such as its compactness, high efficiency, low frictions due to no reciprocating portion, and durability to high temperatures due to no sliding portion except bearings. These features cause a gas turbine to be often used as an exhaust gas turbine that converts pressure energy remaining in exhaust gas emitted from a displacement engine into motive power.

However, rotational speed and load of an engine, when it is used for vehicles such as automobiles, greatly vary depending on operating conditions such as acceleration of a vehicle and slope of roads. This causes large fluctuations in amount of gas emitted from an engine. In particular, a gas turbine substantially deteriorates its efficiency in the range outside of designed gas pressure and flow rate. This causes a gas turbine and an internal combustion engine with an exhaust gas turbine to deteriorate their efficiency under partial load conditions when they are used for vehicles, thus resulting in low fuel economy.

To relieve deterioration of efficiency described above to some extent, Japanese Unexamined Patent Application Publication No. 2001-12252 (also cited in the next paragraph), for example, disclosed a variable nozzle gas turbine that varies angle of vanes constituting nozzles thereof to change overall area of nozzle openings and was used as an automotive turbocharger.

CITED PATENT DOCUMENT 1

Japanese Unexamined Patent Application Publication No. 2001-12252, FIG. 2

DISCLOSURE OF THE INVENTION

Problems to be Solved by the Invention

A conventional variable nozzle turbine includes convergent nozzles. A convergent nozzle has a narrow downstream end that is formed by varying angle of the vane thereof. This configuration limits application of a variable nozzle turbine to the ones using a pressure less than the critical pressure that is reached when velocity of gas reaches the sonic velocity. A variable nozzles turbine also deteriorates its efficiency when a gas flow rate deviates from the operating condition that produces the maximum efficiency. This is caused by a difference between an ideal condition and an actual condition in the relationship between gas inflow angle of rotor blades and circumferential velocity of turbine relative to gas velocity, which the difference is created when the angle of vane changes. A variable nozzles turbine has a further disadvantage of gas leakage that may take place because of large clearance between the housing with large fluctuation of temperature and vanes subject to high temperature to secure the movability of vanes. A variable nozzles turbine has another disadvantage of a large number of heat-resistant parts to be used.

A turbine compressor has excellent features such as its compact configuration and high efficiency; it is therefore suitable for applications such as a turbocharger for a displacement engine that requires compression of a large amount of gas at low pressure. However, similar to the case where being used as a power turbine, a variable nozzles turbine substantially deteriorates efficiency thereof when the operating conditions deviates from the design points in terms of feed volume of gas and compression ratio. Further, low amount of gas passing therethrough relative to compression ratio causes surging with unwanted sound, resulting in decreased function thereof. For this reason, a variable nozzles turbine operated under partial load conditions requires adjustment of amount of gas passing therethrough by releasing the supercharged air into the atmosphere via a surge valve or using a throttle valve, or both. These operations however cause loss of work of the compressor, resulting in decreased efficiency thereof.

In view of the common characteristics of a turbine compressor, i.e., the relatively narrow operating range with good efficiency thereof, a turbocharger that drives a supercharge turbine using an exhaust gas turbine, when it is used for a displacement engine, in general, is so optimally designed as to be most efficient in the middle range of rotational speed of an engine. Therefore, to prevent rotational speed of the turbine from exceeding the limit in the high rotational speed range of an engine, the turbocharger uses a wastegate valve to release the exhaust gases into the atmosphere to secure stable inlet pressure. To the contrary, when the rotational speed of a displacement engine is low relative to the rotational speed of a turbine, measures are taken such as releasing a portion of the supercharged gas into the atmosphere via a surge valve to avoid surging therein. This however results in a loss of the energy produced.

Stable inlet pressure and load of an exhaust turbine can make the rotational speed thereof substantially constant. This makes the rotational speed of a supercharge turbine unchanged even when the rotational speed of an engine rises and no further gas in weight be fed when the cross-sectional area of outlet port of the supercharge turbine is throttled. An attempt of an engine to admit more volume of intake air into a cylinder in a high rotational speed range merely makes supercharging pressure lower because of no change of gas weight, resulting in unchanged output power and decreased torque. An engine with a turbocharger therefore has a high torque in the middle rotational speed range and a substantially high maximum torque when compared with an engine with no turbocharger at the same output power. This characteristic may be an advantage when it is used for a vehicle with a manual control transmission because of its easy operation, but when used with an automatic control transmission or an electric generator, it may become a disadvantage because the size of the transmission and generator are bound to the magnitude of torque, the whole system therefore tends to be larger in size.

Means for Solving Problems and Effect of the Invention

The first means for solving problems according to the present invention provides a gas turbine comprising: a plurality of rotor blades; a plurality of nozzles injecting gas to said plurality of rotor blades, each of said plurality of nozzles including an inlet port, each of a plurality of said inlet ports being circumferentially arranged so as to be grouped with at least one other inlet port into a group; and an opening and closing valve disposed over said plurality of inlet ports so as to be commonly functioned therefore, said opening and closing valve being rotated to vary number of said plurality of nozzles to actuate thereof. The gas turbine according to the first means for solving problems is hereinafter referred to as "variable nozzle number turbine".

The variable nozzle number turbine varies number of nozzles to be actuated so as to change total area of nozzle openings, thereby addressing fluctuation of amount of gas. Since the nozzles themselves are fixedly arranged, the relationship between circumferential velocity and inlet angle and outlet angle of rotor blades is constant at stable rotational speed of the turbine, resulting in high efficiency secured even when amount of gas varies. This provides an advantage of increasing efficiency thereof in partial load conditions when compared with conventional variable nozzle turbines. The variable nozzle turbine has another advantage due to high degree of freedom in nozzle configuration: capable of forming convergent nozzle for achieving sonic velocity or higher and securing high rigidity against a shock wave generated by fluid with the sonic velocity. This enables the turbine to effectively convert exhaust energy into motive power even when using one-stage turbine at high pressure. Opening and closing of the nozzles can be done using an opening and closing valve that rotates about a turbine shaft. This feature can be realized with minimum increase of the number of heat-resistant parts. The sealing surface of the opening and closing valve is configured with a simple surface with the center aligned with the turbine shaft. This provides a further advantage of easily maintaining sealing property thereof against thermal strains.

The variable nozzle number turbine has a benefit of increasing its efficiency under partial load conditions when it is used for a gas turbine engine whose load tends to fluctuates. The variable nozzle turbine may be used as an exhaust gas turbine with a displacement engine such as a two-stroke cycle engine, a four-stroke cycle engine and a six-stroke cycle engine. Such use enables the variable nozzle turbine to effectively extract motive power to outside under low load conditions which are frequently used. This provides an advantage of enabling a turbocharger to generate electric power for a vehicle, which has not been realized so far.

In view of adhesion, the nozzle opening and closing valve is preferably made of material different from material of which the turbine housing is made. If the turbine housing is made of a heat-resistant alloy, the nozzle opening and closing valve is preferably made of a heat-resistant ceramics. In case of decreasing the number of nozzles, gas flow between rotor blades becomes discontinuous. In such a case, an impulse turbine or the like that has no pressure changes at rotor blades is preferably used.

The second means for solving problems according to the present prevention provides a multi-stage turbine comprising at least one gas turbine according to the first means for solving problems, said at least one gas turbine being configured in tandem with multiple stages, each of said at least one gas turbine including a mechanism for varying overall area of openings of said nozzles, said mechanism being independently operated for each of said at least one gas turbine.

The second means for solving problems according to the present prevention enables a gas turbine to employ high inflow pressure and address fluctuation of gas flow rate more effectively using a single-shaft turbine. A multiple-stage configuration enables a gas turbine to employ higher gas pressure even when using a gas flow with the sonic velocity or less: assuming that pressure ratio of outlet to inlet for each stage is 1.9, 3.6 atm. for two stages and 6.8 atm. for three stages can be employed, respectively.

The multi-stage turbine according to the second means for solving problems decreases the overall area of nozzle openings of the turbine essentially in proportion to amount of gas flow that decreases. However, in order to respond to decrease of inlet pressure more effectively, the multiple-stage turbine gives further decrease to the overall area of nozzle openings of an aft stage turbine in response to decrease of the pressure. The decrease of inlet pressure of the turbine causes the outlet/inlet pressure ratio for each stage of turbine to decrease, leading to decrease of velocity of gas flow; however, expansion coefficient of gas also decreases, causing further decrease of volumetric gas flow that comes into an aft stage turbine. This is the reason for further decreasing the overall area of nozzle openings of the aft stage turbine.

The third means for solving problems according to the present invention provides a method for controlling a multi-stage turbine comprising a plurality of turbine shafts and at least one gas turbine according to the first means for solving problems, said at least one gas turbine being configured in tandem with multiple stages, each of said at least one gas turbine including a mechanism for varying overall area of openings of said nozzles, said method comprising maximizing said overall area of openings of said nozzles in order from an aft stage turbine in response to decrease of pressure of inflow gas.

The method for controlling a multi-stage turbine according to the third means for solving problems has an advantage of enabling rotational speed of the forward stage turbine to be kept unchanged against lower pressure of inflow gas. A turbocharger used with an internal combustion engine is an example of the arrangement for driving a supercharge turbine with a forward stage turbine. When engine load lowers and pressure of inflow gas decreases accordingly, such arrangement makes it possible to maximize a cross-sectional area of gas inlet port of an aft stage turbine so as to increase an outlet/inlet pressure ratio of a forward stage turbine before rotational speed of the forward stage turbine decreases. In this way, the control method according to the third means for solving problems enables a forward stage turbine to keep the rotational speed unchanged in wider range of pressure of inflow gas, contributing to more stable control of a supercharging pressure and better response to an increased engine load. It is obvious that a wastegate valve disposed on the upstream side of a nozzle opening and closing valve in a second stage turbine can provide the same effect as the above mentioned measures by releasing pressure into the atmosphere therethrough. This method therefore constitutes the inventive concept of this invention that provides a method for maximizing overall area of nozzle openings of an aft stage turbine when gas pressure at an inlet port decreases to a predetermined pressure.

The third means for solving problems also can provide a plurality of turbine shafts in order to constitute a plurality of turbines with different rotational speed. This makes it possible, for example, to use supersonic gas velocity in a forward stage turbine and subsonic gas velocity in an aft stage turbine.

In this case, a fluctuation of pressure in an aft stage turbine in the range from about 4 atm. up to about 7 atm. can be suitably handled by controlling overall area of nozzle openings of a forward stage turbine that employs supersonic gas velocity so as to avoid gas overexpansion that causes deterioration of its efficiency and to keep an inlet/outlet pressure ratio thereof unchanged while handling the fluctuation of gas pressure only with an aft stage turbine that employs subsonic gas velocity and finally maximizing overall area of nozzle openings thereof in response to decrease of gas pressure. This enables a supercharge turbine driven by the forward stage turbine to keep a stable rotational speed.

The fourth means for solving problems according to the present invention provides a displacement type internal combustion engine comprising a gas turbine according to the first means for solving problems, said gas turbine functioning as an exhaust gas turbine.

The internal combustion engine according to the fourth means for solving problems offers an advantage of effectively converting an energy remaining in exhaust gas into motive power even when amount of the exhaust gas changes in accordance with rotational speed of the engine.

The fifth means for solving problems according to the present invention provides a turbine type compressor comprising: a compression turbine; and a gas turbine according to the first means for solving problems, said gas turbine functioning as a regenerator, said gas turbine being driven by a compressed gas fed from said compression turbine.

The turbine type compressor according to the fifth means for solving problems provides measures for circulating a compressed gas to a variable nozzle number turbine to regenerate an energy produced by the compression turbine in order to avoid a surging even under the gas volume conditions where otherwise causes such surging. Unlike a surge valve, the turbine type compressor has an advantage of operating a compression turbine without taking into consideration of a surge range while not losing energy otherwise available.

It is to be noted that the turbine type compressor according to the fifth means for solving problems is not limited to those having a variable nozzle number turbine with a turbine shaft arranged coaxially to the compressor, in which the variable nozzle number turbine is used as a regenerator. An intention of the fifth means for solving problems is to make the variable nozzle number turbine to regenerate the energy from excess compressed gas generated by the compression turbine. The turbine type compressor therefore includes those having a regenerator with an independent shaft and driving an independent apparatus such as an electric generator.

The sixth means for solving problems according to the present invention provides an internal combustion engine comprising a supercharge turbine, said supercharge turbine functioning as a turbine compressor according to the fifth means for solving problems.

The supercharge turbine can supercharge air with high efficiency even when amount of gas inflow changes. The internal combustion engine according to the sixth means for solving problems therefore can be operated without lowering rotational speed thereof by opening a nozzle opening and closing valve of the turbine even at low rotational speed of the engine. This is also true even when the turbine is optimally designed for high rotational speed of the engine. Unlike a conventional supercharge turbine, the above supercharge turbine therefore can make torque characteristics of the engine stable even when the supercharge turbine is optimally designed for amount of inlet flow in the vicinity of maximum rotational speed of the engine. This can be achieved because supercharging pressure can be kept unchanged even at low rotational speed of the engine. This feature offers an advantage of achieving relatively high power output compared to the size of the main engine as well as contributing to more compact transmission and electric generating system to be chosen. A vehicle equipped with an automatic transmission, in particular, can enjoy this feature because the transmission with the same size as those for a non-supercharged engine at the same power output makes it easier to install a supercharger in such vehicle, enhancing compatibility to a non-supercharged engine.

The sixth means for solving problems also makes it possible to change supercharging pressure and control engine torque by rotational speed of the turbine irrespective of rotational speed of the main engine. This contributes to no pumping loss and better fuel economy. No loss of high pressure gas via a surge valve or a wastegate valve also contributes to improvement of fuel economy in normal use.

The seventh means for solving problems according to the present invention provides a control system for a nozzle opening and closing valve of the gas turbine according to the first means for solving problems comprising: a pair of pistons selectively driven by a fluid pressure; a drive system for operating one of said pistons to operate said nozzle opening and closing valve so as to increase the number of actuated nozzles by one step and operating the other one of said piston to operate said nozzle opening and closing valve so as to decrease the number of actuated nozzles by one step, said drive system including a feed mechanism disposed between said pair of pistons and said nozzle opening and closing valve; a mechanism equalizing loads applied to said pair of pistons upon actuation of said drive system; a spring for returning said pair of pistons to a normal position; and a positioning mechanism for positioning said nozzle opening and closing valve such that said actuated nozzles are not partially open.

The control system for a nozzle opening and closing valve of the gas turbine according to the seventh means for solving problems has a function of operating the nozzle opening and closing valve of the variable nozzle number turbine in a stepwise manner by using a fluid pressure such as inlet pressure of the turbine as a power source. The control system does not require an expensive servomotor and an electric power supply therefore, contributing to a cost reduction. The control system is useful when using as a control system with no electronic component because it requires no maintenance therefore. The control system also has an advantage of avoiding sticking of the opening and closing valve because of its larger torque for valve actuation. Embodiments described later all use control components operated by fluid pressures; however, a portion of those components can be replaced by simple electronics components such as pressure switches, electromagnetic switching valves and simple logic circuits, based on those embodiments. More complex control also can be done by replacing those components by such components as pressure sensors, position sensors and computers.

BRIEF DESCRIPTION OF THE DRAWINGS

FIG. 3B is a cross-sectional view taken along the line Y-Y in FIG. 3A, which is carried out in accordance with a second embodiment of the present invention;

FIG. 12A is a control system diagram for a nozzle opening and closing valve of a six-cycle engine according to the fourth and sixth means for solving problems, in which FIG. 12B is an auxiliary view thereof, which is carried out in accordance with the eighth embodiment of the present invention;

FIG. 13A is a partial view of the nozzle opening and closing valve and a drive gear thereof and FIG. 13B is a mechanism diagram for positioning, which is carried out in accordance with the ninth embodiment of the present invention;

EXPLANATIONS OF LETTERS AND NUMERALS

Figure 1:
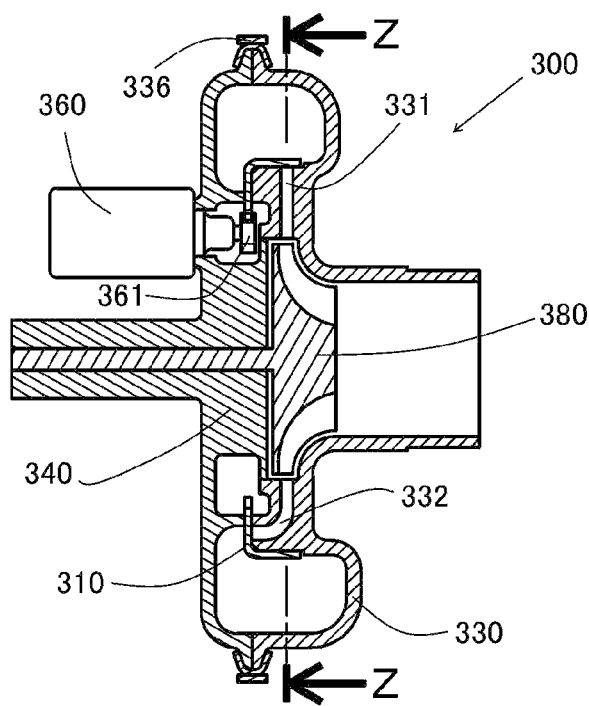
FIG. 1 is a cross-sectional view of the gas turbine according to the first means for solving problems, which is carried out in accordance with a first embodiment of the present invention.

1. Displacement engine (Six-cycle engine)
24. Acceleration sensor
52. Rotational speed sensor
63. Exhaust catalyst
68. Exhaust gas sensor
75. Pressure detection and fuel feed device
80. Exhaust manifold (including combustion chamber)
88. Exhaust tank
90. Fluid path
91, 92. Piston
151, 151B. Electric generator
161. Torque limiter
200. Turbine compressor with regenerator
200b. Inlet port of compressor
200d. Gas exhaust port of regenerating turbine
220. Air tank
221. Inlet manifold
250. Turbine driving motor
260, 360, 460, 470. Rotary actuator
280. Compression turbine
290. Compressor scroll chamber
300. Scroll-type variable nozzle number turbine
310, 310B, 315. Nozzle opening and closing valve
310b. Stopper thereof
311, 312, 311b, 312b. Opening of nozzle opening and closing valve
330, 340, 350. Turbine housing
331, 332. Nozzle
334. Nozzle opening of 332
336. Housing bracket
361, 461, 471. Drive gear
362, 365, 371, 375, 378. Spring
363. Arm with a roller
364. Ratchet
366. Ratchet holder
367. Ratchet control plate
368. Jump preventive plate
369. Retaining pin
370. Driving lever
372, 373. Poppet valve
374. Diaphragm valve
376, 377. Valve
380, 380B. Power turbine
385. Regenerating turbine
388, 388B. Turbine shaft
400, 400B. Axial flow gas turbine
410. Nozzle opening and closing valve of a first stage turbine
420. Nozzle opening and closing valve of a second stage turbine
421, 421b, 422, 422b. Opening of a nozzle opening and closing valve of a second stage turbine
441, 442. Nozzle of a second stage turbine
480. Main shaft of an axial flow turbine
490. Second stage turbine
495. One-way clutch
550. Auxiliary motor to main engine output
560. Motor controller
561. Power line
580. Battery
610. Computer Best Modes for Carrying Out the Invention The following describes modes for carrying out the invention according to embodiments of the invention.

First Embodiment

FIG. 1 illustrates a cross-sectional view of a scroll-type gas turbine 300 according to an embodiment of the present invention in accordance with the first means for solving problems. A nozzle opening and closing valve 310 includes a gear cut on the inner side thereof. The gear rotates by an external force via a drive gear 361 that is driven by a rotary actuator 360 to open and close the valve 310. In FIG. 1, nozzles 331 and 332 are illustrated in such a manner as displaced about the center of the valve. The nozzles are grouped into four groups. Each of the groups includes an opening arranged radially and axially in an alternate manner per 90 degrees and symmetrically about the center, thus comprising 16 nozzles in total. In the present embodiment, the nozzles are positioned symmetrically with respect to the center of the valve in order to balance loads applied to the valve; however, in order to achieve its primary function, they are not necessarily so positioned.

Figure 2:
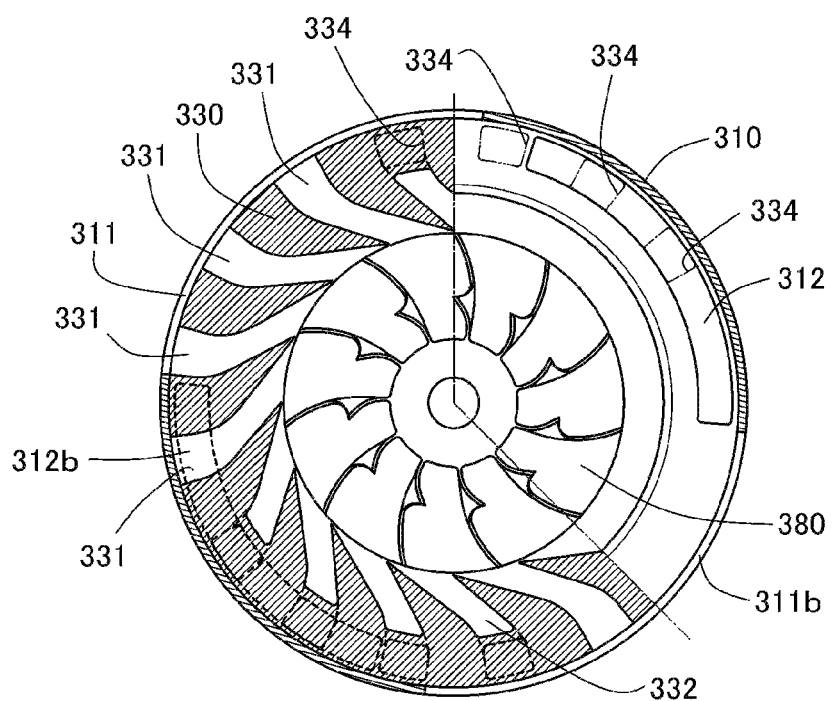
FIG. 2 is an enlarged partial cross-sectional view of the gas turbine taken along the line Z-Z in FIG. 1, which is carried out in accordance with a first embodiment of the present invention.

FIG. 2 illustrates an enlarged cross-sectional view of the opening and closing valve 310 of the gas turbine in FIG. 1, taken along the line Z-Z with only the valve portion shown. A turbine 380 is illustrated in a front elevational view, not in a cross-sectional view. The right side of a dashed line illustrates the opening and closing valve in a solid line and a phantom line of the shape of nozzle inlets in a dashed line with a turbine housing not shown. The opening and closing valve includes the openings 311, 312, 311b, 312b symmetrically arranged about the rotational axis 380, comprising four openings in total. The openings have a function of opening the nozzles. In the present embodiment, the openings 311 and 311b are disposed on a cylindrical surface while the openings 312 and 312b on a disk surface. In this way, a nozzle opening may be disposed on a simple surface such as a cylindrical surface, a disk surface, a conical surface, and a spherical surface, provided that it is on a plane of rotation about a turbine shaft. A sealing effect can be achieved only on one surface, and besides, a gas pressure is exerted on the surface, thus contributing to easy securement of the sealing effect against temperature changes.

The nozzles are opened and closed by a rotation of the opening and closing valve 310 about the turbine shaft. The figure shows a case where 10 nozzles are open: two pairs of the nozzles 331 and 331b which are symmetrically positioned about the turbine shaft, which constitutes in total four valves whose inlet ports are all disposed on the cylindrical surface; and three pairs of the nozzles 332 and 332b which are symmetrically positioned about the turbine shaft, which constitutes in total six valves whose inlet ports are all disposed on the disk surface, and these nozzles currently injecting a gas to the gas turbine. These nozzles can be open of a minimum of 2 nozzles up to a maximum of 16 nozzles by simultaneously opening a pair of nozzles which are symmetrically disposed about the turbine shaft. The nozzle opening and closing valve 310 rotates a slightly less than 80 degrees to open the nozzles in those range.

In this embodiment, the opening and closing valve is operated stepwise so as to prevent the inlet port of the valve from being partially opened. A partially-opened nozzle causes a gas flow in a nozzle to be throttled, making the gas flow velocity therein lower than those of other nozzles that are not partially open. This in turn causes the flow resistance to rise. However, sufficient number of nozzles does not pose such problem even when an opening and closing valve is operated in a continuous manner because it increases little resistance.

The embodiment does not require an identical cross-sectional area of flow path of the nozzles, provided that flow velocities of each nozzle are identical to each other. For example, the flow cross-sectional area of a nozzle with a narrowest path may be optimally designed for an idling operation of a main engine. Besides, increasing and decreasing the number of actuated nozzles by two nozzles per step causes a large change in a total cross-sectional area of actuated nozzles by only one step operation as the number of actuated nozzles decreases. In case of two nozzles being used for example, increasing the number of actuated nozzles to four increases the total cross-sectional area of actuated nozzles as much as twofold if the cross-sectional areas of each nozzle are identical to each other. This rate of change can be eased by reducing the flow sectional-area of nozzles that are opened in the first step of nozzle operation.

Second Embodiment

Figure 3:
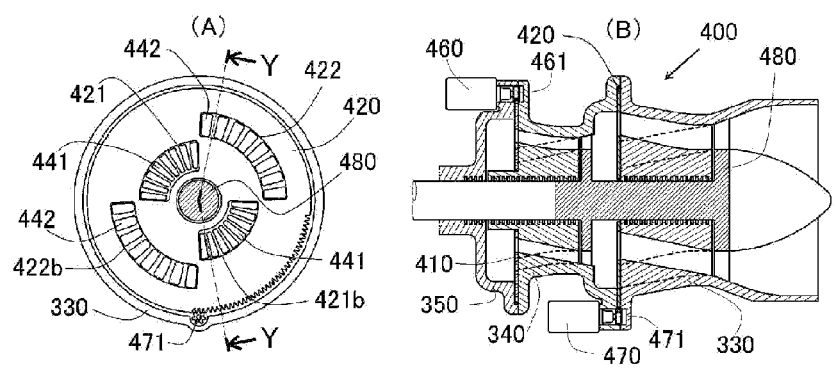
FIG. 3 is a cross-sectional view of the two-stage gas turbine according to the second means for solving problems.

FIG. 3 illustrates a two-stage turbine 400 according to the second means for solving problems. The two-stage turbine 400 includes two axial flow turbines according to the first means for solving problems, in which the two axial flow turbines are coaxially installed. FIG. 3B is a cross-sectional view taken along the line Y-Y in FIG. 3A. Each of a nozzle opening and closing valve 410, 420 includes a gear cut thereon. The gear is driven by a rotary actuator 460, 470 via a drive gear 461, 471.

FIG. 3A is a front elevational view of the nozzle opening and closing valve 420 of the second stage turbine and the nozzle inlets disposed in a turbine housing 330 as seen from the left-hand side of the turbine in FIG. 3B. The elements 421, 421b, 422, 422b designate the openings of the nozzles and closing valve 420, through which nozzle inlets 441, 442 is seen. In this embodiment, the nozzle openings are all disposed on a disk surface. The nozzle opening and closing valve 420 is driven by an external force to be rotated in order to change the number of actuated nozzles depending on operational conditions. In this embodiment, the second turbine includes nozzles 441 through which gas flows in a radially outward direction of the turbine shaft as the gas flow advances in an axial direction, the nozzles 441 being grouped into two groups disposed symmetrically about the turbine shaft and each group including eight nozzles, constituting 16 nozzles in total. The second turbine further includes nozzles 442 through which gas flows in a radially inward direction of the turbine shaft as the gas flow advances in an axial direction, the nozzles 442 being grouped into two groups disposed symmetrically about the turbine shaft and each group including eight nozzles, constituting 16 nozzles in total. The nozzles 441 and 442 constitute 32 nozzles in total. The nozzles in each of the groups are collectively disposed in a radial direction in an alternate manner per 90 degrees in a circumferential direction. This figure illustrates the position of the opening and closing valve at which these nozzles are all open. In this embodiment, the opening and closing valve simultaneously and stepwise opens or closes four nozzles of which a pair of the nozzles is disposed in an alternate manner per 90 degrees. A minimum number of nozzles to be actuated is four. The first stage turbine also includes a nozzle opening and closing valve with the configuration similar to those of the second stage turbine.

Figure 4:
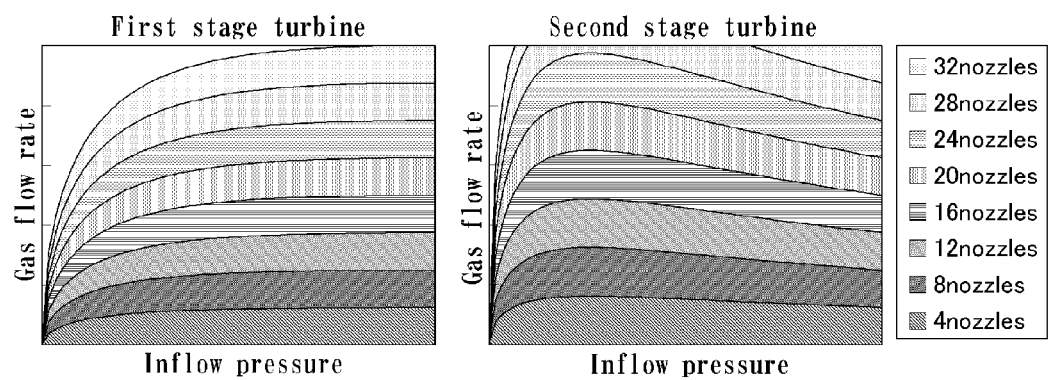
FIG. 4 is a control map for the number of nozzles to be actuated of the turbine in accordance with the second embodiment of the present invention: the left-hand map is of a first turbine and the right-hand map is of a second turbine, which is carried out in accordance with the second embodiment of the present invention.

FIG. 4 is a control map for the number of actuated nozzles of the turbine according to this embodiment. The horizontal axis represents inflow pressure at a collective inlet of the gas turbine while the vertical axis represents gas flow rate translated from gas volume fed in per unit time. The left-hand figure is a control map for the number of actuated nozzles of the first stage turbine where it is assumed that outlet/inlet pressure ratios of the first and second stage turbines are equal to each other. Flow rate at the outlet of the first stage turbine is proportional to the square root of a ratio of differential pressure between outlet and inlet to outlet pressure while gas volume expands in inverse proportion to an outlet/inlet pressure ratio. Therefore, a small decrease of inflow pressure is substantially proportional to a collective volumetric gas flow at the inlet while a large decrease of the inflow pressure causes a substantial decrease of flow rate at the nozzle outlet, thus requiring a lager number of nozzles to be open. The map includes an area that shows insufficient number of nozzles even when all nozzles are open. The area corresponds to an area in which inflow pressure is low and volume of gas flow is large. However, the area also corresponds to the case where a main engine is operated under a low load and high rotational speed if it is used as an exhaust gas turbine. Such case does not frequently take place, thus not posing any problem in its efficiently. An actual case shows that an inflow pressure and a gas flow rate present in this area causes gas flow to be throttled and inflow pressure to rise, the point thus gradually shifting to the area suitable for the number of nozzles as time passes.

The right-hand figure illustrates a control map for the number of actuated nozzles of the second turbine according to this embodiment. Inflow pressure and gas flow rate used in this figure are measured at a collective inlet of the gas turbine in the same manner as those used in the left-hand map. As illustrated in the map, the number of nozzles is proportional to gas flow rate when inflow pressure is at a maximum level. However, once inflow pressure begins decreasing, an inlet/outlet pressure rate per stage also decreases. Expansion coefficient of gas in the first stage turbine accordingly decreases. Therefore, when compared to the case where the maximum pressure is used, decrease rate of volumetric gas flow in the second stage turbine is larger than that of volumetric gas flow in the first stage turbine. The second stage turbine is thus required to further reduce a total area of nozzle openings. Further decrease of gas pressure causes a substantial decrease of flow velocity at nozzle outlets like the case of the first turbine, thus requiring a larger overall area of nozzle openings. The map therefore takes such figure.

Third Embodiment

Figure 5:
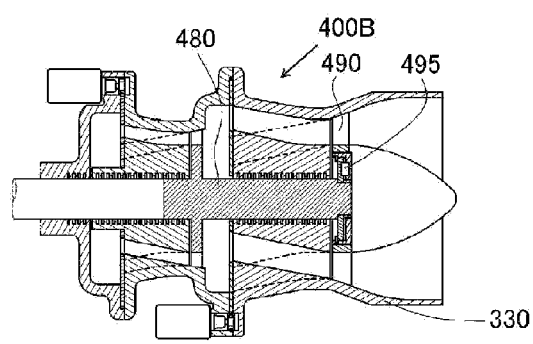
FIG. 5 is a cross-sectional view of the multi-stage turbine according to the second embodiment in accordance with the second means for solving problems, which is carried out in accordance with a third embodiment of the present invention.

FIG. 5 illustrates a cross-sectional view of the second embodiment according to the second means for solving problems. The structure of the nozzle opening and closing valve is identical to those of the second embodiment as illustrated in FIG. 3. A second stage turbine 490 is rotatably connected to a first stage turbine via a one-way clutch 495, thus substantially constituting a dual shaft turbine. Upon the gas pressure at a collective inlet lowering sufficiently for the first stage turbine to receive the whole amount of pressure energy, the dual shaft turbine operates in such a manner that it fully opens an opening and closing valve of the second turbine to maximize the overall area of nozzle openings thereof so as to keep the velocity of gas flow at the nozzle outlet of the first stage turbine unchanged, thereby keeping the rotational speed of a main shaft 480 substantially constant. At this moment, the velocity of the gas injected by nozzles of the second stage turbine lowers, causing the rotational speed of the second stage turbine decreases. This in turn makes the one-way clutch 495 free so as to cause the main shaft 480 to be driven only by the first stage turbine.

Figure 6:
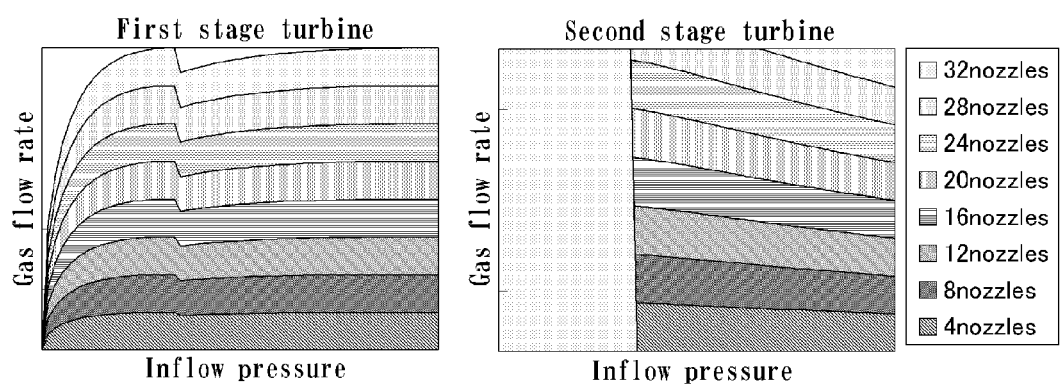
FIG. 6 is a control map for the number of actuated nozzles of the turbine according to the third embodiment in accordance with the third means for solving problems: the left-hand map is of a first turbine and the right-hand map is of a second turbine, which is carried out in accordance with the third embodiment of the present invention.

The right-hand figure in FIG. 6 illustrates a control map for the number of actuated nozzles of the second turbine according to this embodiment. Characteristics for high inflow pressure ranges are similar to those illustrated in FIG. 4. Upon the inflow pressure reaching a value for the first stage turbine to be able to handle the whole amount of pressure energy, all the nozzles of the second stage turbine are open to maximize the overall area of nozzle openings thereof, thereby lowering the gas pressure at the inlet of the second stage turbine.

The left hand figure in FIG. 6 illustrates a control map for the number of actuated nozzles at the first stage of the turbine according to this embodiment. Once the inflow pressure reaches a predetermined value and nozzles of the second turbine are all open, the pressure at the outlet of the first stage turbine nears atmospheric pressure, causing the volumetric gas flow at nozzle outlets increases while an increase of the inlet/outlet pressure ratio causes an increase in flow velocity. The predetermined pressure value for switching such operation modes in this embodiment has a larger effect of increasing the flow velocity rather than increasing the volumetric gas flow. Opening all of the valves of the second stage turbine thus requires decreasing the number of nozzles of the first stage turbine to some extent. The control map therefore takes such figure.

The above mentioned map control enables the turbine to effectively convert a pressure energy to a motive power as well as an upstream turbine to keep the rotational speed near that for a full load condition even under a low load condition where gas flow rate and inflow pressure decrease. This high rotational speed of the first stage turbine makes it possible for a supercharge turbine driven thereby to immediately shift to a high load condition as a main engine enters into a high load condition next time.

Fourth Embodiment

Figure 7:
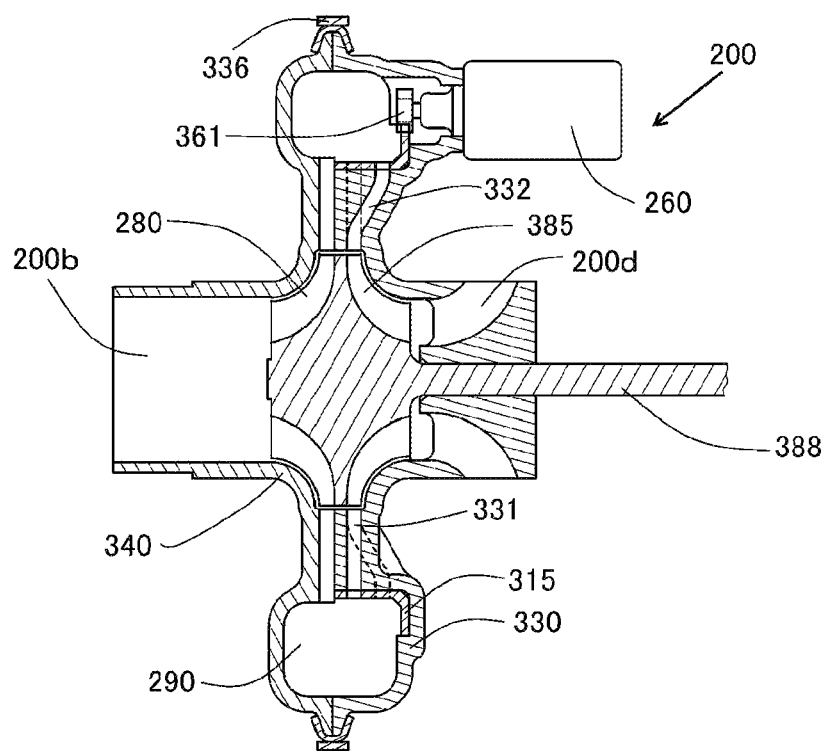
FIG. 7 illustrates a turbine compressor equipped with a regenerator according to the fifth means for solving problems, which is carried out in accordance with a fourth embodiment of the present invention.

FIG. 7 illustrates a cross-sectional view of a turbine compressor according to the fifth means for solving problems. The turbine compressor includes a variable nozzle number turbine 385 used as a regenerator. The turbine compressor is driven by a portion of compressed gas generated by a compression turbine 280. The turbine 385 includes an opening and closing valve 315 disposed in a scroll chamber 290 of the compressor. The turbine 385 immediately regenerates a remaining gas compressed by the compression turbine to produce a driving power before the gas temperature decreases in order to drive the compression turbine 280 together with a driving power transmitted via an input shaft 288.

Figure 8:
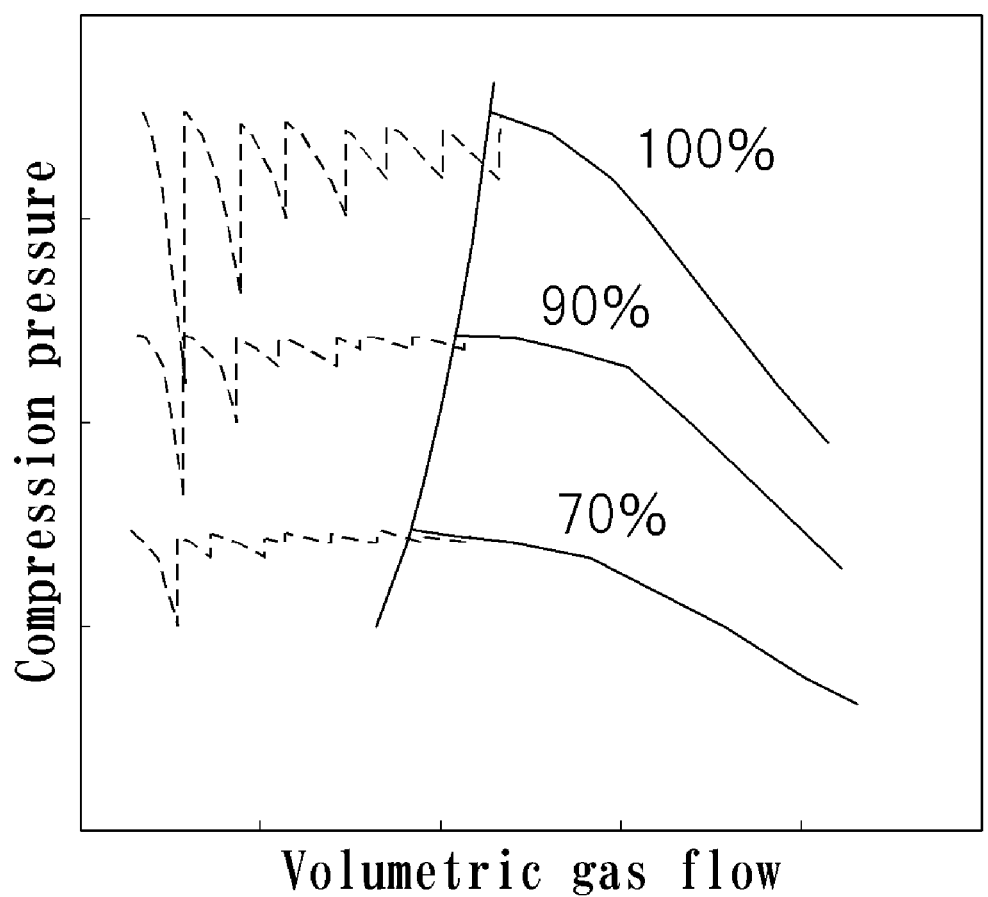
FIG. 8 is a characteristic diagram of the turbine compressor equipped with a regenerator according to the fifth means for solving problems, which is carried out in accordance with the fourth embodiment of the present invention.

FIG. 8 illustrated a characteristic diagram of the turbine. The horizontal axis represents a volumetric gas flow at a collective inlet of the compressor while the vertical axis represents a compression pressure. The thick solid curving lines from top left to bottom right represents characteristics of the compression turbine 280 when it is independently operated at 100%, 90% and 70% rotational speeds of a design rotational speed thereof, respectively. The thick solid line from bottom left to top right represents a surge line of the compression turbine 280 when it is independently operated. The left-hand area of this line corresponds to a surge area that may cause surging. In view of surging, the compression turbine 280 is desirably used in an area remote from the surge line; however, an area with an excellent efficiency of the compression turbine corresponds to the right-hand area adjacent to the surge line, in which each of the characteristic curves shows a high pressure. Such use therefore deteriorates its efficiency.

Dashed lines in contrast represent characteristics of the turbine compressor according to the fifth means for solving problems. A variable nozzle number turbine used as a regenerator with nozzles all closed provides characteristics identical to the solid lines which represent characteristics of the turbine 280 when it is independently operated. Upon decrease of flow rate, the opening and closing valve of the variable nozzle number turbine is open to avoid entering into a surge area and increases the number of actuated nozzles stepwise from 0 to 12 by two steps. These operations provide such characteristics as shown in this figure. Cases where the opening and closing valve may need to close all nozzles differentiate this embodiment from the case where it is used as an exhaust gas turbine.

The turbine compressor equipped with regenerator according to the fifth means for solving problems enables the compression turbine 280 to be constantly operated in the area with high efficiency, thus leading to a highly efficient compressor over a wide range of operation. This embodiment still leaves a surge area; however, the area does not pose any problem for a practical use when it is used as a supercharger under an operating condition with gas flow rate nearly equal to zero. This area can be eliminated by using a variable nozzle number turbine used as a regenerator with a slightly larger capacity.

Fifth Embodiment

Figure 9:
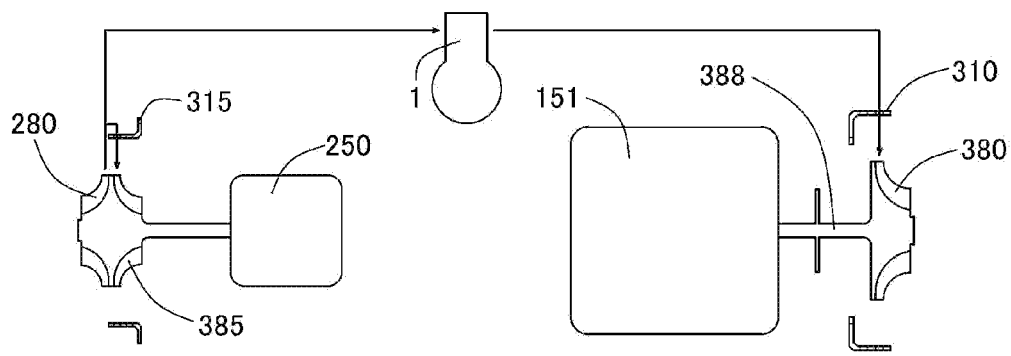
FIG. 9 is a schematic view illustrating the first embodiment employing the internal combustion engine according to the sixth means for solving problems, which is carried out in accordance with a fifth embodiment of the present invention.

FIG. 9 illustrates a schematic view of an internal combustion engine 1 according to the sixth means for solving problems. Each of the fifth to seventh embodiments adopts a variable nozzle number gas turbine as an exhaust gas turbine. Such application is also employed in an embodiment according to the fourth means for solving problems, in which the output is converted to an electric power by an electric generator 151. The electric power drives a motor 250 to drive a compression turbine with a regenerator as a supercharger according to an embodiment of the present invention. The motor 250 controls a rotational speed of the turbine to control a supercharging pressure.

An engine increases volume of air admitted thereinto in proportion to rotational speed thereof. Torque thereof also increases in proportion to supercharging pressure thereof. Assuming that a turbine with the characteristics illustrated in FIG. 8 is used as a supercharger for an internal combustion engine, it can be so interpreted that the horizontal axis represents a rotational speed of the engine and the vertical axis represents a critical torque characteristic that can be output by the engine at the corresponding rotational speed. The figure shows that such application can realize a flat torque characteristic and the torque can be controlled by a rotational speed of a supercharge turbine. It also shows that a larger number of narrow nozzles of a variable nozzle number turbine used for regenerating provides a flatter characteristic of an engine torque; in particular, reducing cross-sectional areas of nozzles that are opened only when an opening and closing valve is fully open produces a larger effect on such characteristic.

Sixth Embodiment

Figure 10:
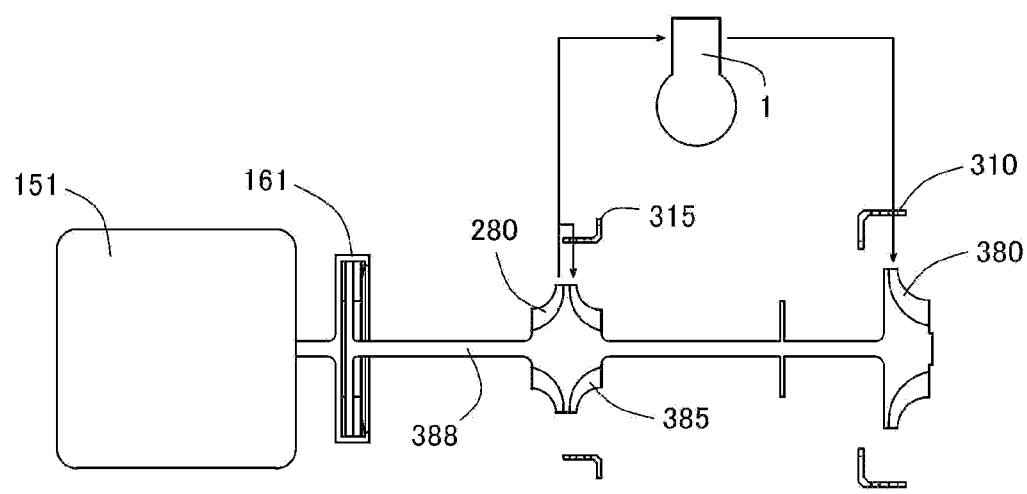
FIG. 10 is a schematic view illustrating the second embodiment employing the internal combustion engine according to the sixth means for solving problems, which is carried out in accordance with a sixth embodiment of the present invention.

FIG. 10 illustrates a schematic view of the second embodiment for an internal combustion engine according to the sixth means for solving problems. A variable nozzle number turbine 381 is used as an exhaust gas turbine. The turbine 381 drives a turbine compressor according to an embodiment of the present invention and feeds supercharged air into an engine 1. A surplus output power is converted into an electric power by an electric generator 151. Rotational speed and supercharging pressure of the turbine are controlled by changing a load of the electric generator. The turbine has a relatively long shaft which may cause a resonant oscillation. The turbine shaft therefore includes a torque limiter 161 to reduce a resonance torque of the shaft so as to prevent the shaft from generating such oscillation.

Seventh Embodiment

Figure 11:
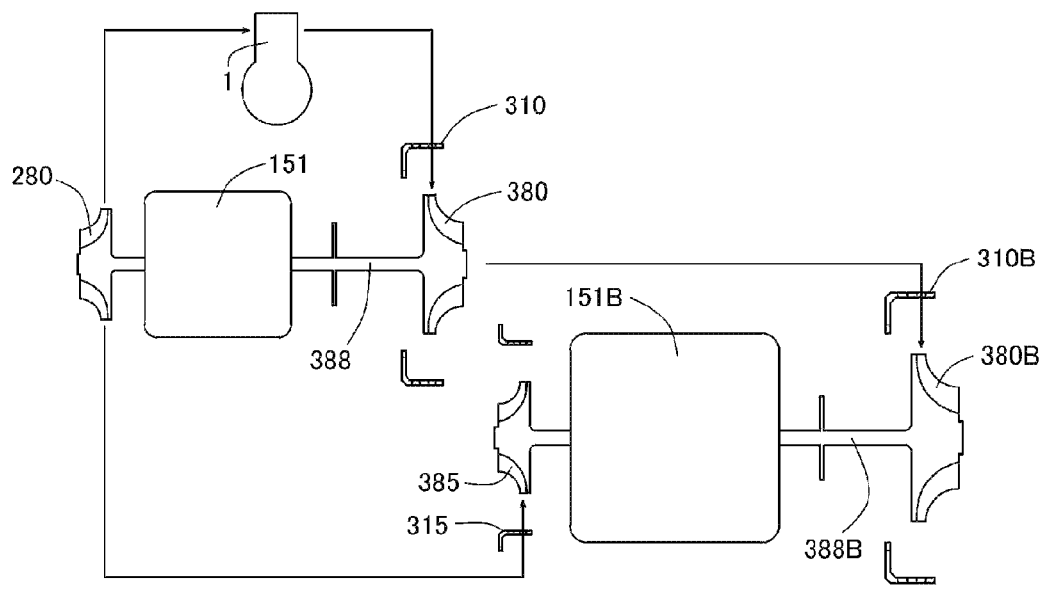
FIG. 11 is a schematic view illustrating the third embodiment employing the internal combustion engine according to the sixth means for solving problems, which is carried out in accordance with a seventh embodiment of the present invention.

FIG. 11 illustrates a schematic view of the third embodiment for an internal combustion engine according to the sixth means for solving problems. This embodiment includes a two-stage variable nozzle number turbine 380, 380B used as an exhaust gas turbine. The embodiment therefore also constitutes the second means for solving problems. A compression turbine 280 is driven by an output power produced by a first-stage variable nozzle number turbine 381. A surplus output power produced by the compression turbine 280 is converted to an electric power by an electric generator 151. Rotational speed and supercharging pressure of the turbine are controlled by changing a load torque of the electric generator. A variable nozzle number turbine 385 includes a separate turbine shaft. The variable nozzle number turbine 385 is used as a regenerator and driven by a portion of supercharged air. The variable nozzle number turbine 385 and the second stage turbine 380B drive an electric generator 151B to generate an electric power as well as the electric generator 151.

Eighth Embodiment

Figure 12:
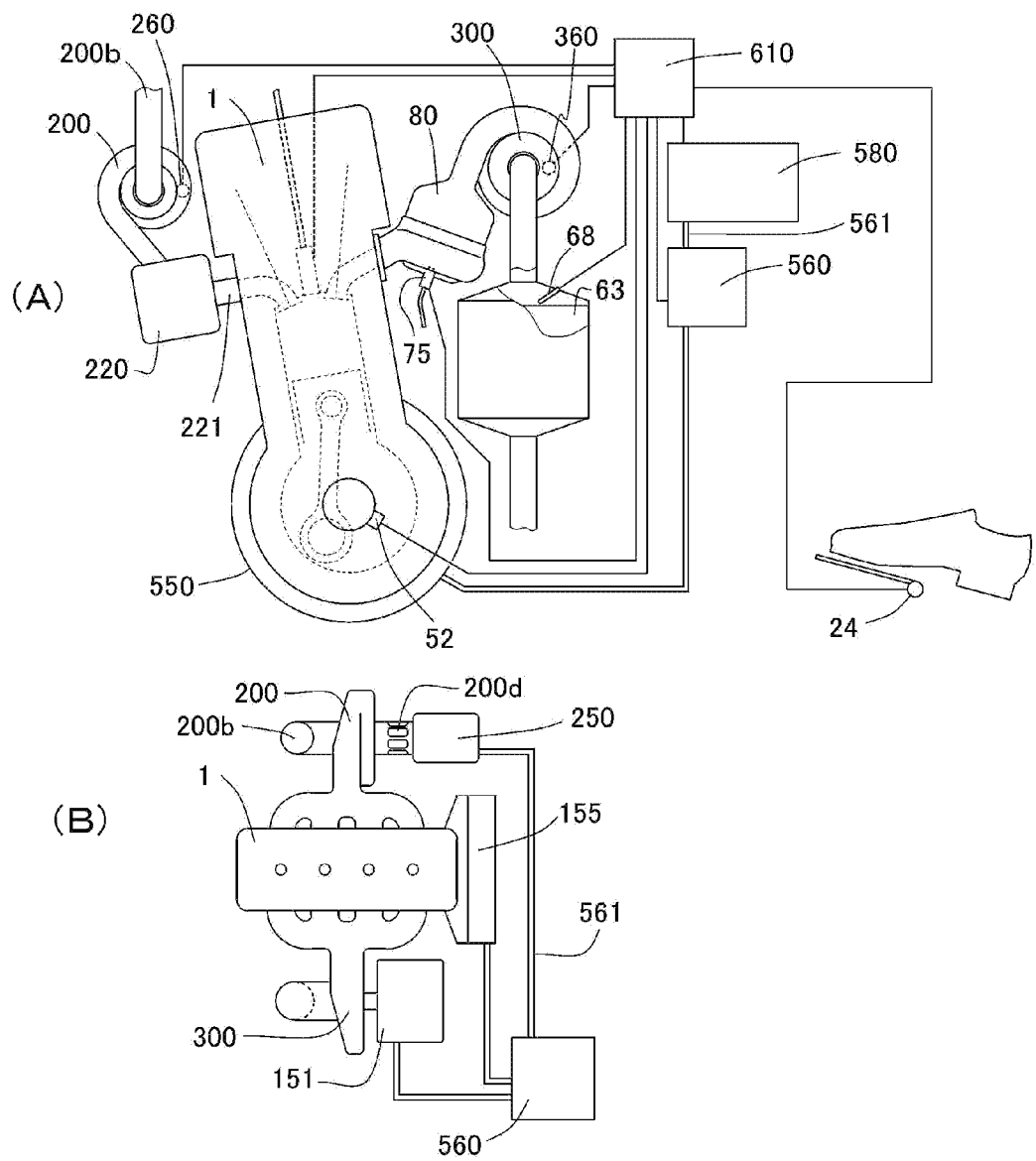

FIG. 12 illustrates a schematic view of a control system for a six-cycle engine according to the fourth and sixth means for solving problems. This embodiment includes a six-cycle engine 1 having a turbine compressor and a variable nozzle number turbine according to an embodiment of the present invention, in which the turbine compressor is used as a supercharge turbine and the variable nozzle number turbine as a exhaust gas turbine, respectively. The configuration of the embodiment is similar to the schematic view in FIG. 9. FIG. 12B is a auxiliary view for illustrating power lines that are not shown in FIG. 12A, in which the engine 1 is seen from above. A control computer 610 includes exhaust gas pressure detecting means 75 for detecting an exhaust gas pressure at an inlet of an exhaust gas turbine, engine rotational speed detecting means 52 for detecting a rotational speed of an engine, and accelerator opening detecting means 24 for detecting an opening of an accelerator. A motor controller 560 includes means for controlling according to an instruction from the computer an electric generating torque of an electric generator 151, a torque of a turbine driving motor 250, and a torque of an auxiliary motor to main engine output 550. The computer 610 gives an instruction for controlling rotational speed of the electric generator 151 such that an exhaust gas turbine rotates at an appropriate rotation speed for an exhaust gas pressure, an instruction for controlling rotational speed of the motor 250 so as to control a supercharging pressure according to a detected value of the acceleration sensor 24, and an instruction for controlling torque of the auxiliary motor to main engine output. The auxiliary motor to main engine output 550 is primarily driven by the electric generator 151; however, any temporary excess and deficiency of the electric power are supplemented by a battery 580.

The computer further includes means for driving an actuator 360, 260 that opens and closes an opening and closing valve of a variable nozzle number turbine. This means drives the actuator 260 based on a judgment of a value detected by the rotational speed sensor 52 of the engine and a rotational speed of the motor 250, thereby controlling the number of actuated nozzles of a regenerating turbine such that an operation condition of a compression turbine of a turbine compressor 200 does not enter into a surge area. An air tank 220 is disposed at an inlet of a supercharge turbine for absorbing a pressure pulsation caused by an air admission of the engine to suppress surging of the turbine. The actuator 360 is driven based on a judgment of a detected exhaust gas pressure so as to provide an exhaust gas pressure appropriate for a rotational speed of the engine and an accelerator opening, thereby controlling the number of actuated nozzles of the exhaust gas turbine.

In this case, to keep the exhaust gas pressure constant, a pressure switch is sufficient for the purpose of the exhaust gas pressure detecting means 75. The exhaust gas pressure detecting means also can be dispensed with by alternative means such as estimating an exhaust gas pressure from a detected rotational speed of the motor 250 instead of a rotational speed of the supercharge turbine and a detected rotational speed of the engine.

Ninth Embodiment

Figure 13:
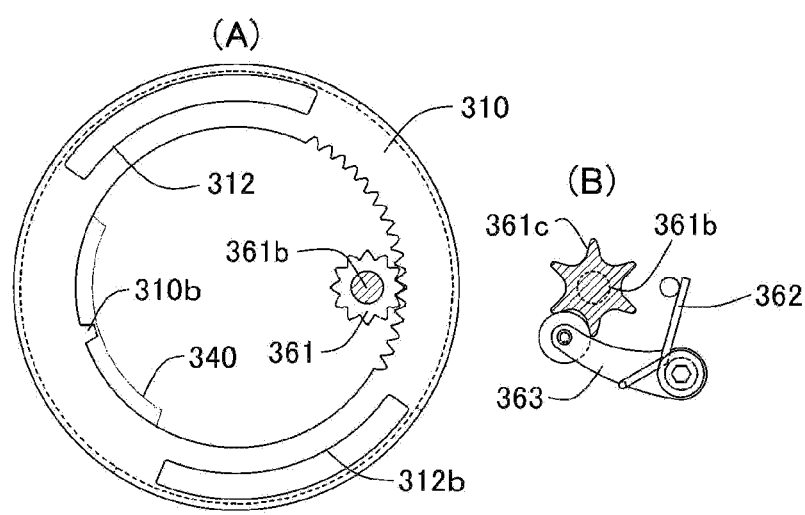
FIG. 13 is a control system diagram of a nozzle opening and closing valve according to the seventh means for solving problems.

FIG. 13 and the following figures are schematic views of a mechanism of a control system for the number of actuated nozzles of a turbine according to the seventh means for solving problems, in which the control system is used for a nozzle opening and closing valve of a turbine according to the first embodiment. FIG. 13A is a partial view illustrating an opening and closing valve 310 and a drive gear 361 thereof. Devices such as a turbine and a housing are not shown. The drive gear is illustrated with a shaft 361b thereof shown in a cross-sectional view. The shaft 361b is rotatably coupled to a housing 340. Every sixty-degree rotation of the drive gear increases or decreases the number of actuated nozzles by two nozzles via the opening and closing valve. Reference numeral 310b denotes a stopper that defines a range of movement of the opening and closing valve along a groove of a housing 340. The groove is shown by a two-dot chain line.

FIG. 13B illustrates a positioning mechanism including a cam 361c and a roller-equipped arm 363. The cam 361c is integrally formed with the drive gear that is disposed outside of the housing 340. The roller-equipped arm 363 is pushed against the cam 361c by a spring 362. The positioning mechanism serves to fix the drive gear every 60 degree rotation. The drive gear 361 is not shown in this figure.

Figure 14:
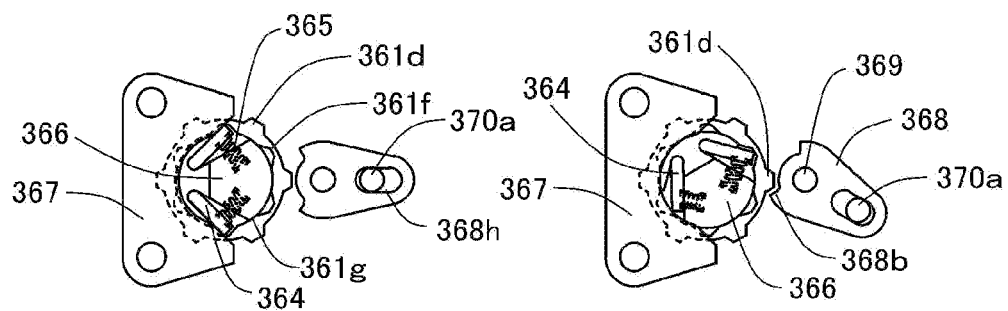
FIG. 14 is a partial view of a feed mechanism of the control system of the nozzle opening and closing valve according to the seventh means for solving problems: The left-hand view illustrates a reference position thereof and the right-hand view illustrates an actuated position, which is carried out in accordance with the ninth embodiment of the present invention.

FIG. 14 illustrates a feed mechanism. The drive gear includes a ring 361g integrally formed therewith via the cam 361c. The ring 361g includes six ratchets 361d formed in the outer side thereof and six grooves 361f formed in the inner side thereof. A ratchet holder 366 is slidably and rotatably coupled to the inner side of the ring 361g. The ratchet holder 366 includes a pair of ratchets 364 and a pair of ratchet springs 365 for clockwise and counterclockwise rotation, respectively. The ratchet holder 366 is illustrated in a cross-sectional view but without hatching. The left-hand view illustrates a normal position, from which rotation of the ratchet holder in either direction makes the ratchet couple with the groove 361f to rotate the drive gear together therewith. The right-hand view illustrates an operating state in which the ratchet holder rotates 60 degrees in the clockwise direction from the normal position. When the ratchet holder returns to the normal position shown in the left-hand view from the operating position, a ratchet control plate 367 fixed to the housing retracts the ratchet 364 disposed in the rotational direction to cause the drive gear to stop at the position shown in the right-hand view by the positioning mechanism without being got caught in the groove. The ratchet control plate concurrently serves to prevent the ratchet holder from dropping out of the ring 361g.

A jump preventive plate 368 is rotatably coupled to a pin 369 fixed to the housing and not interfered with a motion of the drive gear in the normal state shown in the left-hand view; however, in the operating state shown in the right-hand view, the plate rotates upon an actuation of a pin 370a coupled to the inner side of an elongate hole 368h to cause a ratchet 368b to interfere with a ratchet 361d, thereby preventing the drive gear from rotating over 60 degrees per one operation.

Figure 15:
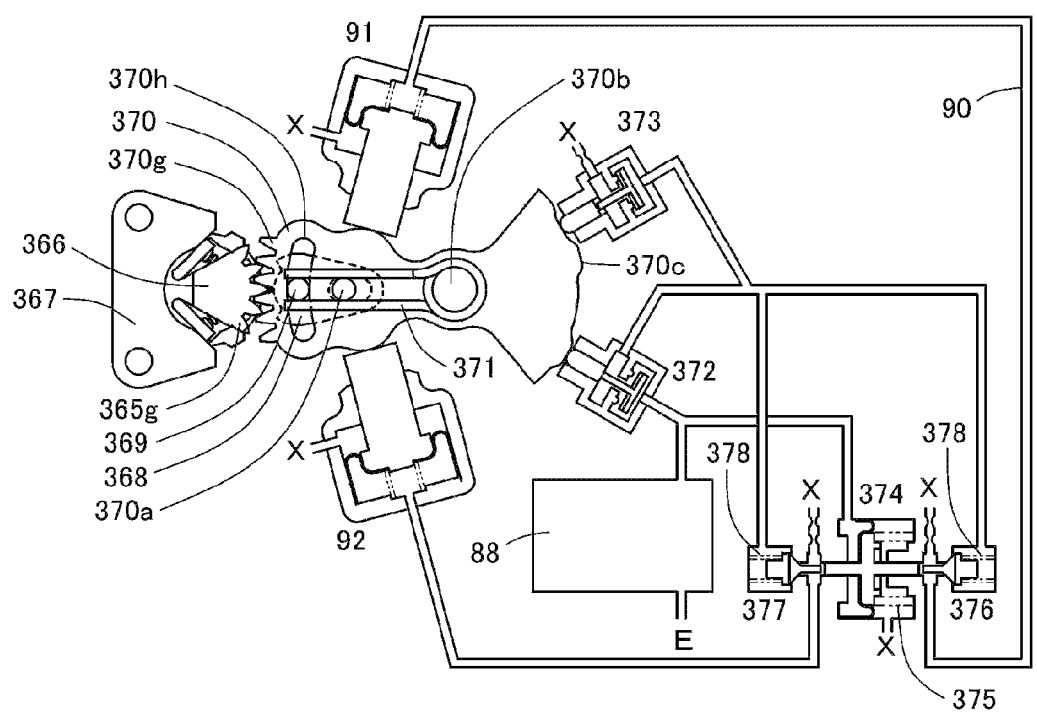
FIG. 15 is a diagram illustrating a driving lever and a fluid circuit of the control system of the nozzle opening and closing valve according to the seventh means for solving problems, which is carried out in accordance with the ninth embodiment of the present invention.

FIG. 15 is a schematic view of a driving lever 370 and a fluid pressure circuit thereof. The lever 370 is a plate-shaped member. The above mentioned pin 370a is integrally formed in a manner that it protrudes through the both side thereof. The jump preventive plate 368 is disposed on the backside of the lever. The lever includes a gear 370g formed at the tip end thereof to engage with a gear 365g formed on the ratchet holder. The lever swings about a shaft 370b to rotate the ratchet holder. An elongate hole 370h formed in the lever is penetrated by a retaining pin 369 therethrough to limit a swing angle of the lever. A spring 371 is installed in a manner that it elastically sandwiches the retaining pin 369 and the pin 370a together therewith. It serves to return the lever and piston to the normal position when no external force is applied.

Reference symbol E in the fluid circuit diagram denotes an inlet pressure of a turbine and X denotes an atmospheric pressure. An exhaust gas of an internal combustion engine includes a pressure pulsation. An inlet pressure of a turbine is therefore first led to a small exhaust chamber 88 to stabilize a pressure thereof. This operating system employs a high pressure gas of the exhaust chamber as a power source. Each of valves shows a cross section thereof but without hatching.

The lever includes a cam 370c formed thereon for actuating two poppet valves 372, 373. When the lever is at the normal position, the valve 372 is open to feed a gas to valves 376, 377. A diaphragm valve 374, when a gas pressure in the chamber is adequate, balances with a spring 375. Upon a change larger than a predetermined pressure against the pressure, it overcomes a force of a spring 378 that supports the valves 376, 377 to open either of the valves, thereby actuating either of pistons 91, 92.

An increase of an inlet pressure E of the turbine causes the diaphragm valve 374 to move in the right direction, the valve 366 to open, the piston 91 to be actuated, the lever to move in the downward direction, and the ratchet holder and the drive gear to be rotated in the clockwise direction. When the pressure exceeds a range in which a torque resistance produced by the cam of the positioning mechanism is relatively large, the valve 372 closes; however, the lever remains to be actuated until a remaining pressure in the piston is discharged out via an orifice. Upon completion of actuation of the lever, the drive gear rotates 60 degrees then stops thereat by the positioning mechanism. The opening and closing valve increments the number of actuated nozzles by two nozzles. At this moment, after a roller pasts a cam peak of the positioning mechanism, a cam 370c formed on the lever opens the valve 373. When the diaphragm valve 374 is in an actuated state, the cam 370c immediately releases a pressure in the piston 91 into the atmosphere to prepare for a next actuation. When the diaphragm valve is not in an actuated state, the pressure is also released into the atmosphere via an orifice. Upon completion of releasing the pressure, the spring 371 causes the lever, the ratchet holder and the piston to return to the normal position.

To the contrary, when the inlet pressure E lowers, the piston 92 is actuated to move the lever in an upward direction, thereby decrementing the number of actuated nozzles by two nozzles in the same manner as the case of incrementing the nozzle number.

Industrial Applicability

The variable nozzle number gas turbine according to the present invention is useful when used as a gas turbine for producing power output in applications with a large variation in gas flow rate because of its high efficiency irrespective of gas flow rate and excellent fuel economy. A small-sized gas turbine engine including a turbine compressor according to the present invention can make best use of the feature thereof for realizing a gas turbine engine with high efficiency even in a partial load condition when compared with such type of a conventional engine.

When the turbine according to the present invention is used as a exhaust gas turbine or a supercharge turbine for an displacement type internal combustion engine, it can keep its efficiency high even if gas flow rate of the engine varies according to a load variation and make use of a surplus power in generating an electric power. These features thereof offer an excellent applicability to such applications. Further, a turbine compressor with a regenerator according to the present invention can prevent it from surging, thus making a compression pressure higher irrespective of gas flow rate. A displacement engine using this turbine compressor as a supercharger therefore can control the torque by employing a supercharging pressure instead of a throttle valve, leading to higher efficiency even under partial load conditions. Another advantage is its flat torque characteristic. This makes the whole system of the engine compact when it is used with an automatic transmission and an electric generator.

The invention claimed is:

1. A variable nozzle number gas turbine comprising:
a plurality of rotor blades;
a plurality of nozzles injecting gas to said plurality of rotor blades, each of said plurality of nozzles including an inlet port, a plurality of said inlet ports being grouped into at least two circular arcs arranged in a separate manner and at separate radial distances around a turbine axis which forms a center of each circular arc; and
an opening and closing valve disposed over said plurality of inlet ports so as to be commonly functioned therefore, said opening and closing valve being rotated to vary number of said plurality of nozzles to actuate thereof, and having a plurality of openings each in a circular arc shape, wherein a number of said circular arcs is the same as a number of said openings and a respective opening is arranged to correspond to a respective circular arc.

2. A multi-stage turbine comprising the at least one variable nozzle number gas turbine of claim 1, said at least one variable nozzle number gas turbine being configured in tandem with multiple stages, each of said at least one gas turbine including a mechanism for individually varying an overall area of a plurality of nozzle openings of each of said at least one variable nozzle number gas turbine.

3. A displacement type internal combustion engine comprising the exhaust gas turbine of claim 1.

4. The variable nozzle number gas turbine of claim 1, wherein said at least two circular arcs includes a first pair of circular arcs arranged around a shaft of the variable nozzle number gas turbine and spaced apart from each other with an angular distance of approximately 90 degrees.

5. The variable nozzle number gas turbine of claim 4, wherein said at least two circular arcs further includes a second pair of circular arcs arranged around the shaft outside the first pair of circular arcs and spaced apart from each other with an angular distance of approximately 90 degrees, wherein the second pair of circular arcs are arranged to face a space formed between the first pair of circular arcs.

6. The variable nozzle number gas turbine of claim 1, wherein the plurality of said inlet ports are circularly arranged in a 360-degree way.

7. The variable nozzle number gas turbine of claim 1, wherein said opening and closing valve includes at least two holes positioned to correspond to said at least two circular arcs, wherein said at least two holes respectively open and shut two or more nozzles on said at least two circular arcs according to a rotation of said opening and closing valve.

8. A control method for controlling a multi-stage turbine comprising at least two variable nozzle number gas turbines of claim 1, said at least two variable nozzle number gas turbines including a first gas turbine at a forward stage and a second gas turbine at an aft stage which are arranged in series, said method comprising:
varying an overall area of a plurality of nozzle openings of each of said at least two variable nozzle number gas turbines in proportion to a variation of a flow rate of a gas fed to said at least two variable nozzle number gas turbines; and
reducing an overall area of a plurality of nozzle openings disposed on the second gas turbine at the aft stage in a rate larger than that of an overall area of a plurality of nozzle openings disposed on the first gas turbine at the forward stage in proportion to a decrease of a pressure of said gas.

9. A displacement type internal combustion engine including an exhaust gas turbine comprising the multi-stage turbine employing the control method of claim 8.

10. A control method for controlling a multi-stage turbine comprising the at least two variable nozzle number gas turbines of claim 1, said at least two variable nozzle number gas turbines being configured in tandem with multiple stages, each of said at least two variable nozzle number gas turbines being capable of rotating at an individual rotational speed, said method comprising maximizing an overall area of a plurality of nozzle openings of at least one of said at least two variable nozzle number gas turbines in order from an aft stage turbine in response to a decrease of pressure of an inflow gas.

11. A displacement type internal combustion engine including an exhaust gas turbine comprising the multi-stage turbine employing the control method of claim 10.

12. A turbine type compressor comprising:
a compression turbine;
the variable nozzle number gas turbine of claim 1, said variable nozzle number gas turbine functioning as a regenerator; and
a passage provided between the compression turbine and the variable nozzle number gas turbine and supplying a high-pressure gas of the compression turbine to the opening and closing valve of the variable nozzle number gas turbine,
wherein said variable nozzle number gas turbine is driven by the compressed gas fed from said compression turbine through the passage.

13. An internal combustion engine comprising the turbine compressor of claim 12.

14. A control system for a nozzle opening and closing valve of the variable nozzle number turbine of claim 1, comprising:
a pair of pistons selectively driven by a fluid pressure;
a drive system for operating one of said pistons to operate said nozzle opening and closing valve so as to increase the number of actuated nozzles by one step and operating the other one of said piston to operate said nozzle opening and closing valve so as to decrease the number of actuated nozzles by one step, said drive system including a feed mechanism disposed between said pair of pistons and said nozzle opening and closing valve;
a mechanism equalizing loads applied to said pair of pistons upon actuation of said drive system;
a spring for returning said pair of pistons to a normal position; and
a positioning mechanism for positioning said nozzle opening and closing valve such that said actuated nozzles are not partially open.

* * * * *